United States Patent
Hsu et al.

(10) Patent No.: US 11,769,347 B2
(45) Date of Patent: Sep. 26, 2023

(54) EYE CENTER LOCALIZATION METHOD AND LOCALIZATION SYSTEM THEREOF

(71) Applicant: NATIONAL CHUNG CHENG UNIVERSITY, Chiayi (TW)

(72) Inventors: Wei-Yen Hsu, Chiayi (TW); Chi-Jui Chung, Chiayi (TW)

(73) Assignee: NATIONAL CHUNG CHENG UNIVERSITY, Chiayi (TW)

( * ) Notice: Subject to any disclaimer, the term of this patent is extended or adjusted under 35 U.S.C. 154(b) by 157 days.

(21) Appl. No.: 17/355,140

(22) Filed: Jun. 22, 2021

(65) Prior Publication Data

US 2022/0374633 A1 Nov. 24, 2022

(30) Foreign Application Priority Data

May 20, 2021 (TW) ................................. 110118349

(51) Int. Cl.
*G06V 40/16* (2022.01)
*G06F 16/50* (2019.01)
(Continued)

(52) U.S. Cl.
CPC ............ *G06V 40/171* (2022.01); *G06F 16/50* (2019.01); *G06N 3/049* (2013.01); *G06V 40/165* (2022.01); *G06V 40/18* (2022.01)

(58) Field of Classification Search
CPC ............... G06V 40/172–173; G06V 40/165
See application file for complete search history.

(56) References Cited

U.S. PATENT DOCUMENTS 10,121,055 B1 * 11/2018 Savvides ............. G06F 18/2113
10,796,476 B1 * 10/2020 Xing .................... G06T 15/04
(Continued)

FOREIGN PATENT DOCUMENTS

CN 108319937 A 7/2018
CN 108717527 A 10/2018
(Continued)

OTHER PUBLICATIONS

Wei-Yen Hsu et al., "A Novel Eye Center Localization Method for Head Poses With Large Rotations", IEEE Transactions on Image Processing, published on Dec. 17, 2020, vol. 30, pp. 1369-1381, published by IEEE, United States.

*Primary Examiner* — John R Schnurr
*Assistant Examiner* — Frank Johnson
(74) *Attorney, Agent, or Firm* — CKC & Partners Co., LLC

(57) ABSTRACT

An eye center localization method includes performing an image sketching step, a frontal face generating step, an eye center marking step and a geometric transforming step. The image sketching step is performed to drive a processing unit to sketch a face image from the image. The frontal face generating step is performed to drive the processing unit to transform the face image into a frontal face image according to a frontal face generating model. The eye center marking step is performed to drive the processing unit to mark a frontal eye center position information on the frontal face image. The geometric transforming step is performed to drive the processing unit to calculate two rotating variables between the face image and the frontal face image, and calculate the eye center position information according to the two rotating variables and the frontal eye center position information.

8 Claims, 9 Drawing Sheets

(51) Int. Cl.
*G06N 3/049* (2023.01)
*G06V 40/18* (2022.01)

(56) References Cited

U.S. PATENT DOCUMENTS

| | | | | |
|---|---|---|---|---|
| 2009/0087097 | A1* | 4/2009 | Suehiro | G06V 40/171 |
| | | | | 382/190 |
| 2009/0309878 | A1* | 12/2009 | Otani | G06V 40/172 |
| | | | | 345/427 |
| 2011/0091113 | A1* | 4/2011 | Ito | G06V 10/754 |
| | | | | 382/197 |
| 2012/0070041 | A1* | 3/2012 | Wang | G06F 21/32 |
| | | | | 382/118 |
| 2012/0269405 | A1* | 10/2012 | Kaneda | G06V 40/19 |
| | | | | 382/118 |
| 2016/0132718 | A1* | 5/2016 | Park | G06V 10/243 |
| | | | | 382/118 |
| 2018/0005021 | A1* | 1/2018 | Young | G06V 40/165 |
| 2021/0012093 | A1* | 1/2021 | Rao | G06V 40/172 |
| 2021/0232803 | A1* | 7/2021 | Fu | G06V 10/764 |

FOREIGN PATENT DOCUMENTS

| | | |
|---|---|---|
| EP | 1774470 B1 | 12/2014 |
| TW | 201911082 A | 3/2019 |

\* cited by examiner

EYE CENTER LOCALIZATION METHOD AND LOCALIZATION SYSTEM THEREOF

RELATED APPLICATIONS

This application claims priority to Taiwan Application Serial Number 110118349, filed May 20, 2021, which is herein incorporated by reference.

BACKGROUND

Technical Field

The present disclosure relates to a localization method and a localization system. More particularly, the present disclosure relates to an eye center localization method and a localization system thereof.

Description of Related Art

An eye center localization method can calculate an eye center coordinate from an image with human face. However, the conventional eye center localization methods are applied to an image of frontal face or image of head posture in specific rotating angle. If the rotating angle of the image is too big, the conventional eye center localization method cannot locate the eye center from the image correctly.

Thus, a method and a system for locating the eye center which is not restricting by the rotating angle of the head in the image are commercially desirable.

SUMMARY

According to one aspect of the present disclosure, an eye center localization method is configured to locate an eye center position information from an image, the eye center localization method includes performing an image sketching step, a frontal face generating step, an eye center marking step and a geometric transforming step. The image sketching step is performed to drive a processing unit to sketch a face image from the image of a database. The frontal face generating step is performed to drive the processing unit to transform the face image into a frontal face image according to a frontal face generating model. The eye center marking step is performed to drive the processing unit to mark a frontal eye center position information on the frontal face image according to a gradient method. The geometric transforming step is performed to drive the processing unit to calculate two rotating variables between the face image and the frontal face image, and calculate the eye center position information according to the two rotating variables and the frontal eye center position information.

According to another aspect of the present disclosure, an eye center localization system is configured to locate an eye center position information from an image, the eye center localization system includes a database and a processing unit. The database is configured to access the image, a frontal face generating model and a gradient method. The processing unit is electrically connected to the database, the processing unit receives the image, the frontal face generating model and the gradient method and is configured to implement an eye center localization method includes performing an image sketching step, a frontal face generating step, an eye center marking step and a geometric transforming step. The image sketching step is performed to sketch a face image from the image. The frontal face generating step is performed to transform the face image into a frontal face image according to the frontal face generating model. The eye center marking step is performed to mark a frontal eye center position information on the frontal face image according to the gradient method. The geometric transforming step is performed to calculate two rotating variables between the face image and the frontal face image, and calculate the eye center position information according to the two rotating variables and the frontal eye center position information.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
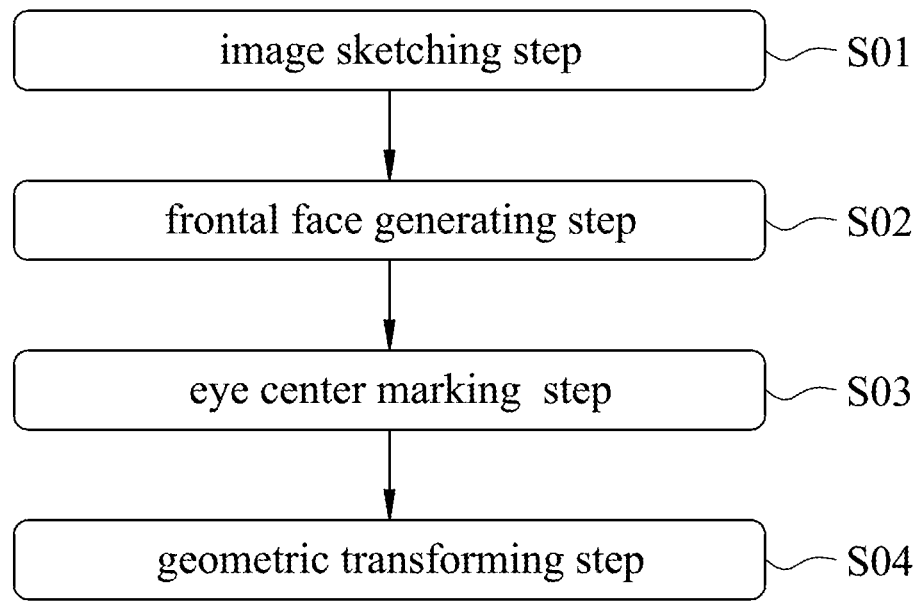
FIG. 1 shows a flow chart of an eye center localization method according to a first embodiment of the present disclosure.

Please refer to FIG. 1. FIG. 1 shows a flow chart of an eye center localization method 100 according to a first embodiment of the present disclosure. The eye center localization method 100 is configured to locate an eye center position information from an image. The eye center localization method 100 includes performing an image sketching step S01, a frontal face generating step S02, an eye center marking step S03 and a geometric transforming step S04. The image sketching step S01 is performed to drive a processing unit to sketch a face image from the image of a database. The frontal face generating step S02 is performed to drive the processing unit to transform the face image into a frontal face image according to a frontal face generating model. The eye center marking step S03 is performed to drive the processing unit to mark a frontal eye center position information on the frontal face image according to a gradient method. The geometric transforming step S04 is performed to drive the processing unit to calculate two rotating variables between the face image and the frontal face image, and calculate the eye center position information according to the two rotating variables and the frontal eye center position information. In detail, the image can be a normal view face image, a non-normal view face image, a face image with shaded eye region or a face image with defect region. Thus, the eye center localization method 100 of the present disclosure locates the eye center position information from a non-normal view face image.

Figure 2:
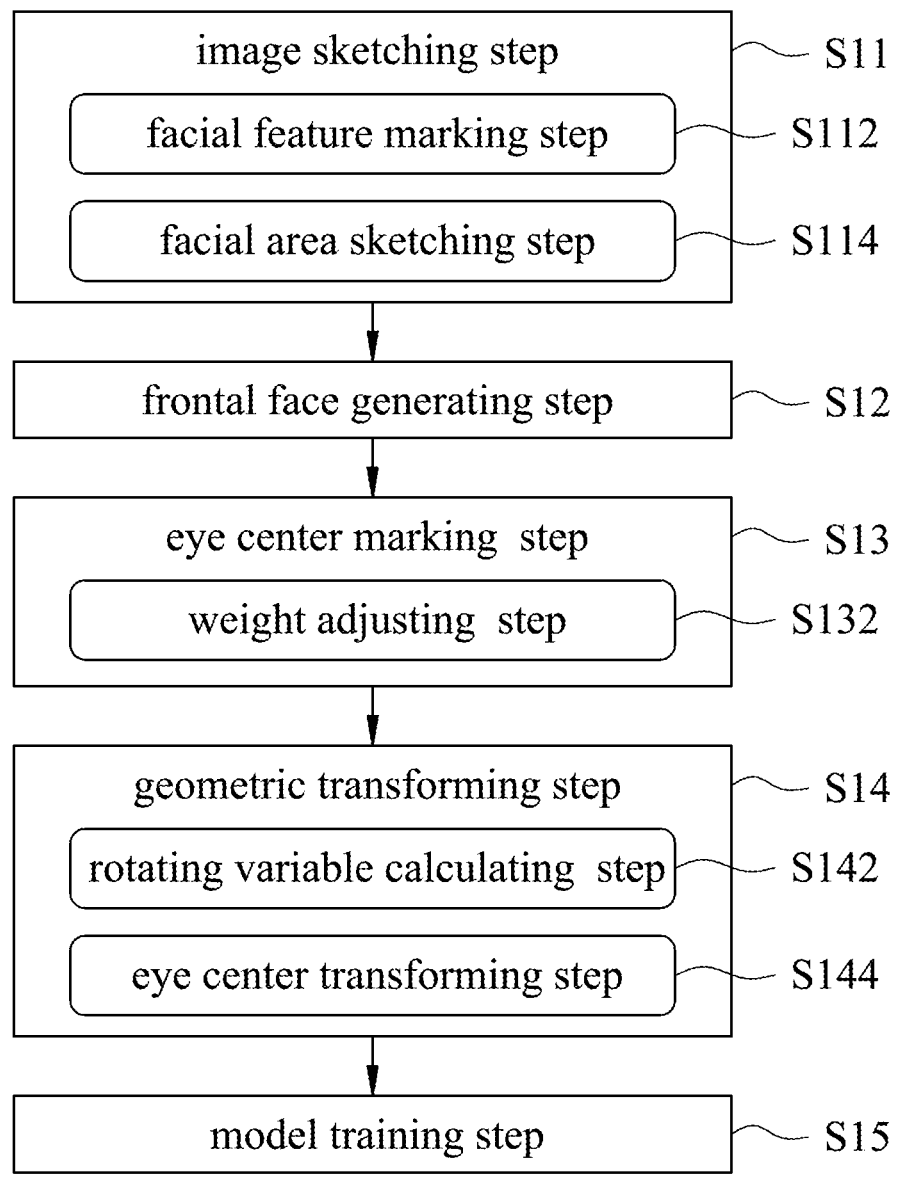
FIG. 2 shows a flow chart of an eye center localization method according to a second embodiment of the present disclosure.
Figure 3:
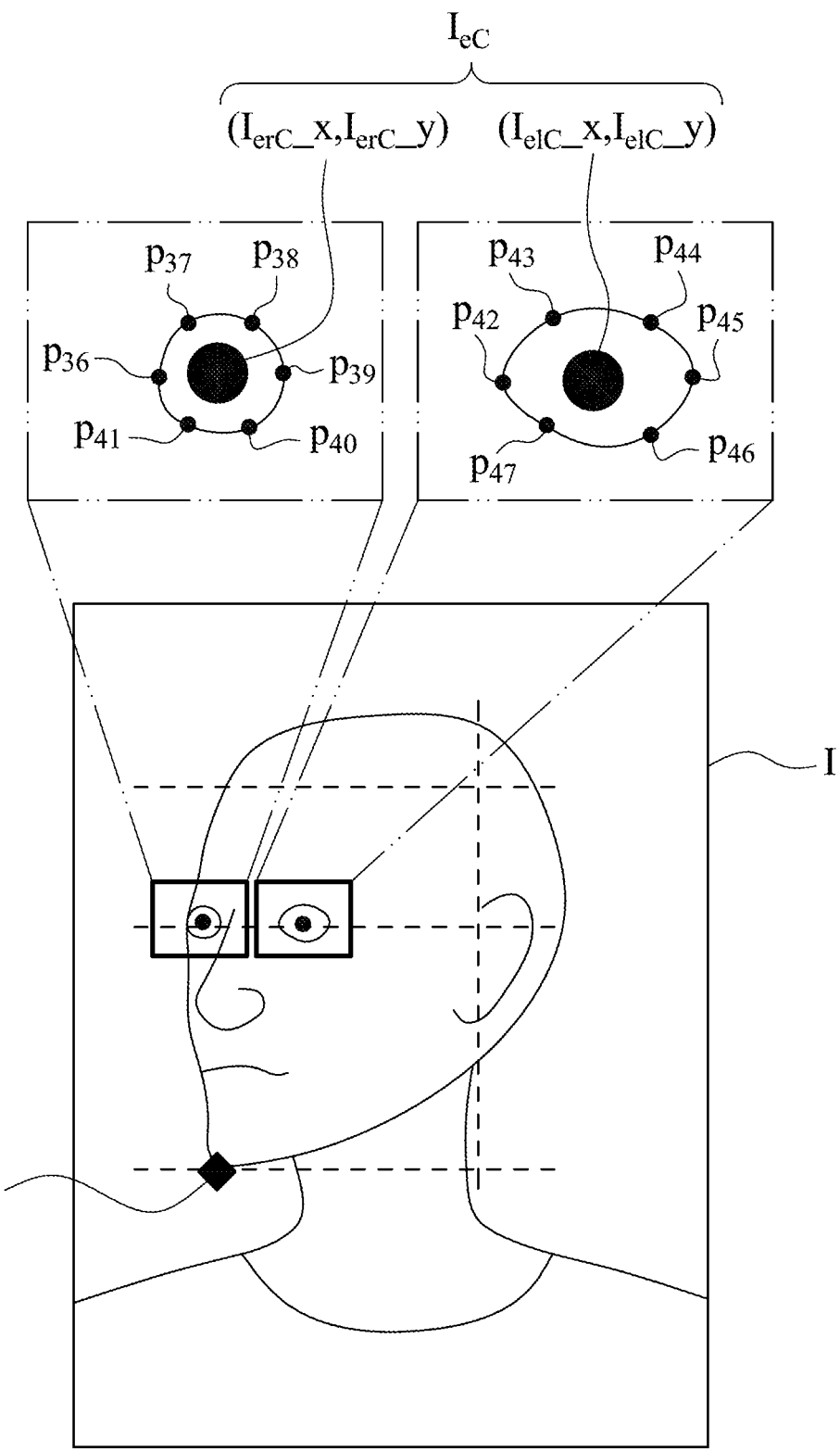
FIG. 3 shows a schematic view of an image of an image sketching step of the eye center localization method of FIG. 2.
Figure 4:
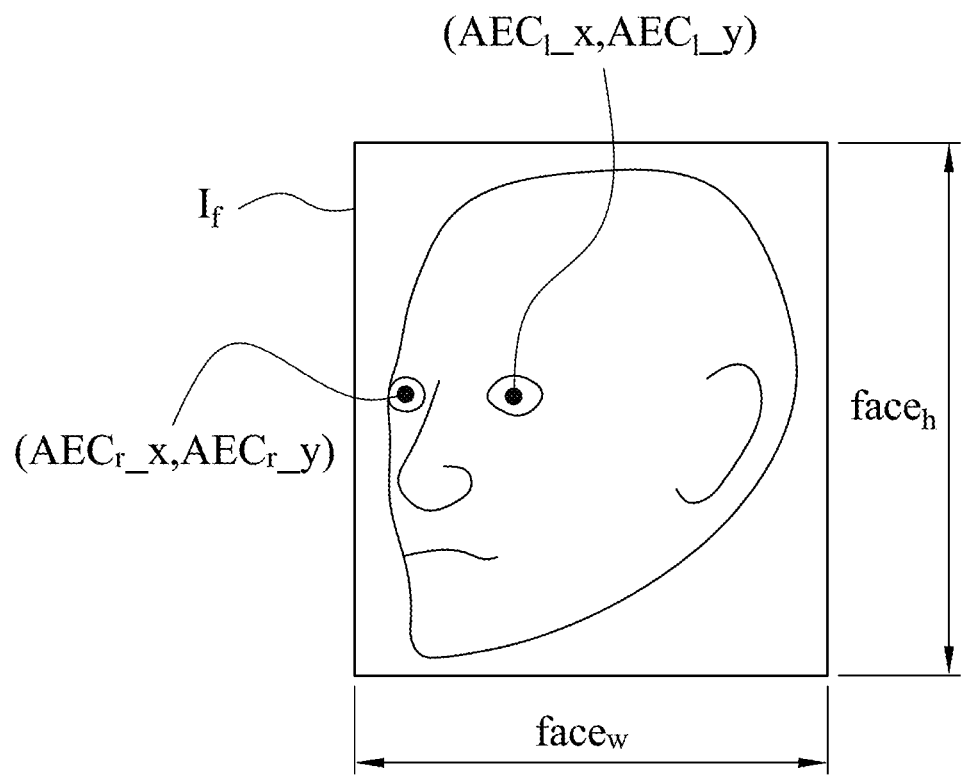
FIG. 4 shows a schematic view of a face image of the image sketching step of the eye center localization method of FIG. 2.
Figure 5:
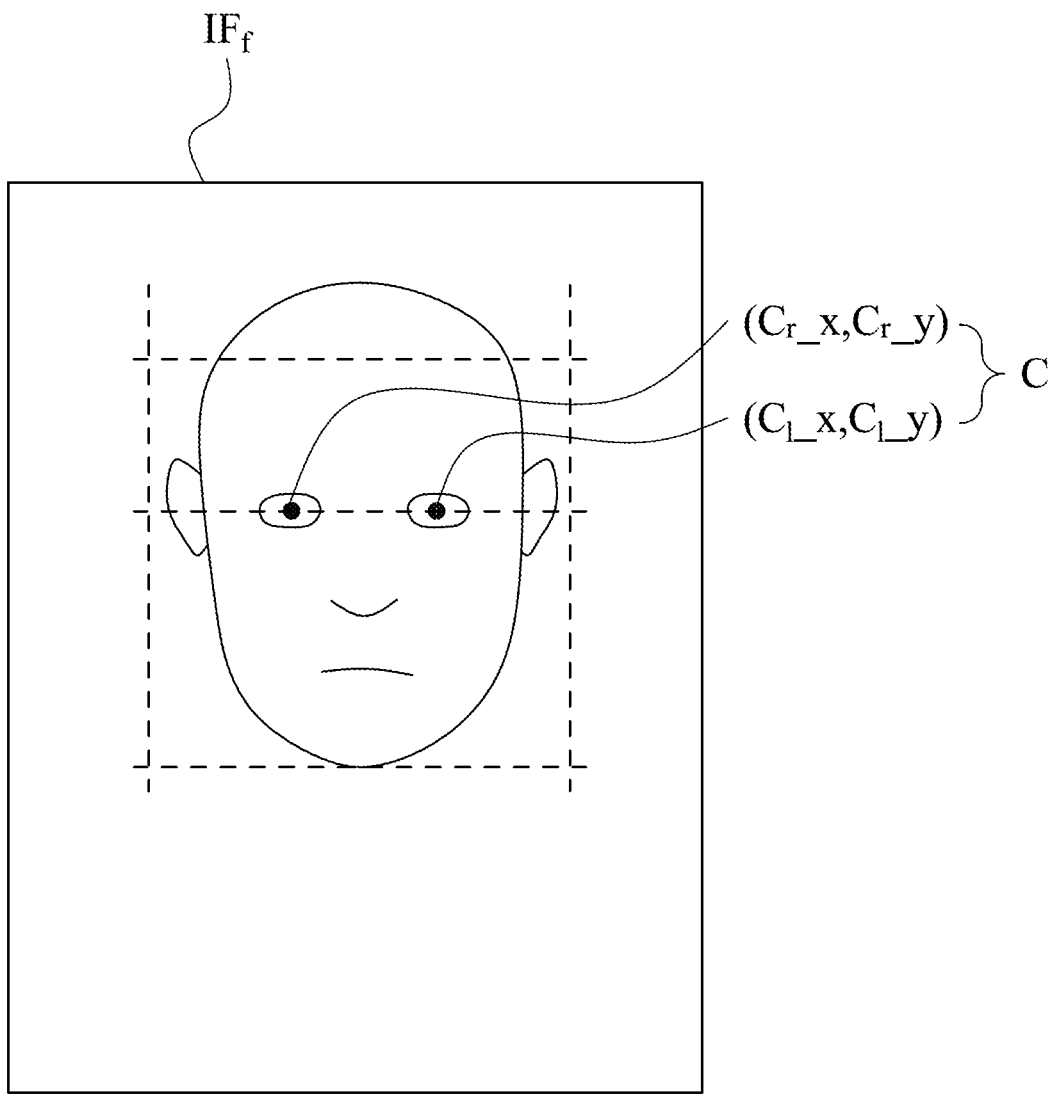
FIG. 5 shows a schematic view of a frontal face image of a frontal face generating step of the eye center localization method of FIG. 2.
Figure 6:
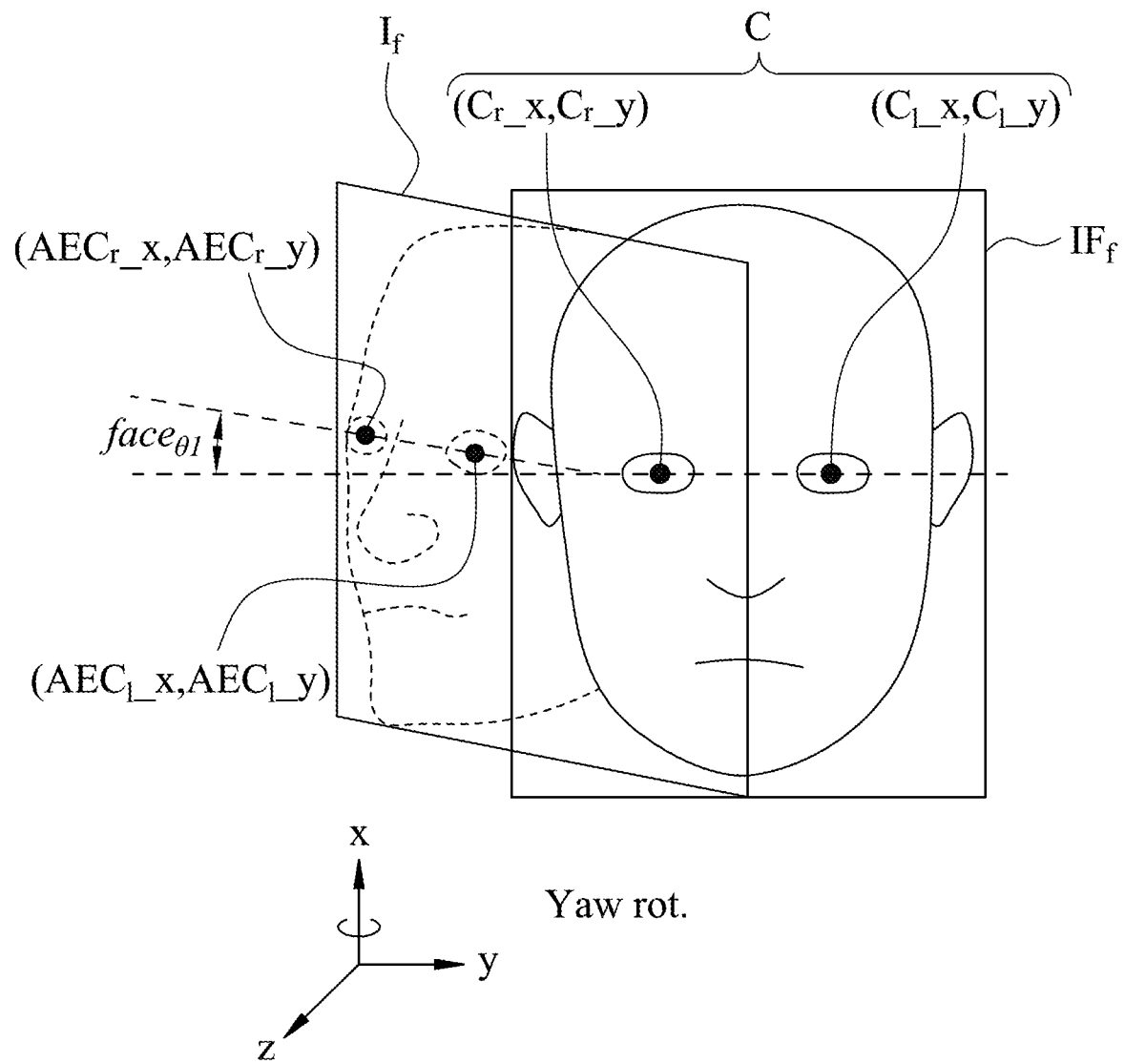
FIG. 6 shows a schematic view of a rotating variable of a geometric transforming step of the eye center localization method of FIG. 2.
Figure 7:
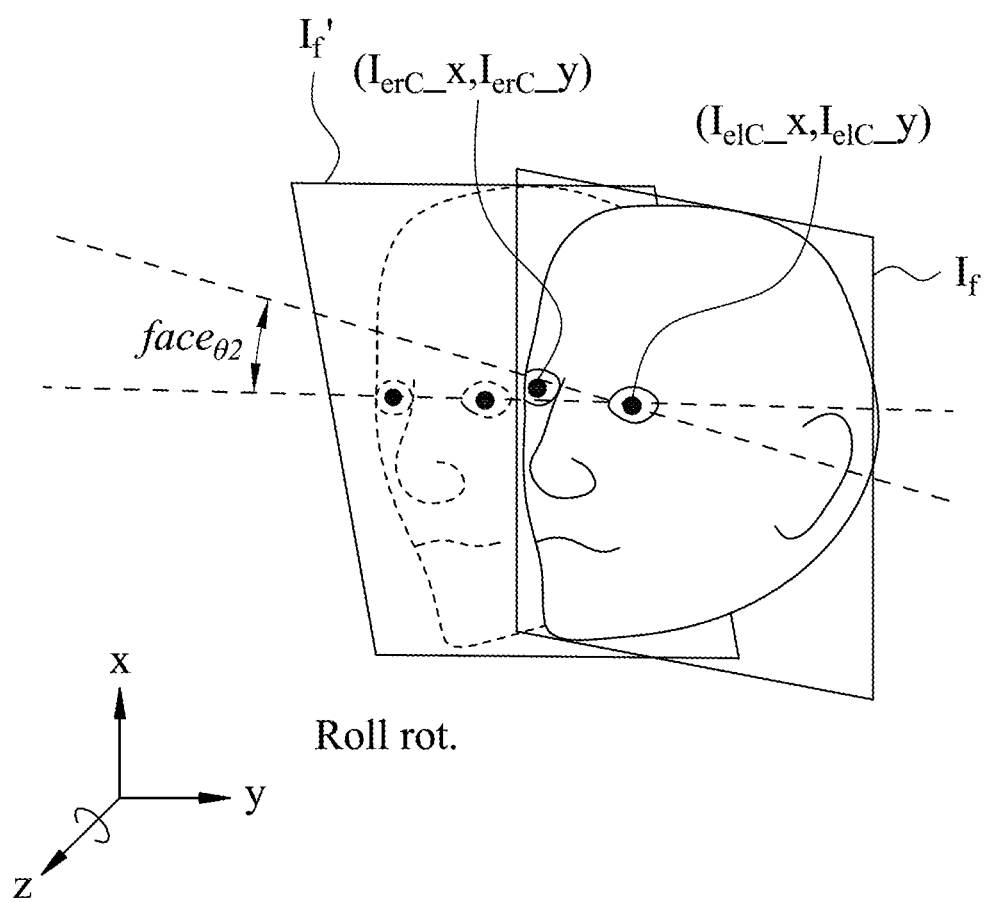
FIG. 7 shows a schematic view of another rotating variable of the geometric transforming step of the eye center localization method of FIG. 2.

Please refer to FIG. 2 to FIG. 7. FIG. 2 shows a flow chart of an eye center localization method 100a according to a second embodiment of the present disclosure. FIG. 3 shows a schematic view of an image I of an image sketching step S11 of the eye center localization method 100a of FIG. 2. FIG. 4 shows a schematic view of a face image $I_f$ of the image sketching step S11 of the eye center localization method 100a of FIG. 2. FIG. 5 shows a schematic view of a frontal face image $IF_f$ of a frontal face generating step S12 of the eye center localization method 100a of FIG. 2. FIG. 6 shows a schematic view of a rotating variable $face_{\theta 1}$ of a geometric transforming step S14 of the eye center localization method 100a of FIG. 2. FIG. 7 shows a schematic view of another rotating variable $face_{\theta 2}$ of the geometric transforming step S14 of the eye center localization method 100a of FIG. 2. The eye center localization method 100a includes performing an image sketching step S11, a frontal face generating step S12, an eye center marking step S13 and a geometric transforming step S14. The image sketching step S11 is performed to drive a processing unit to sketch the face image $I_f$ from the image I of a database. The image sketching step S11 includes a facial feature marking step S112 and a facial area sketching step S114. The facial feature marking step S112 is performed to mark a chin feature point $p_8$, right eye feature points $p_{36}$, $p_{37}$, $p_{38}$, $p_{39}$, $p_{40}$, $p_{41}$ and left eye feature points $p_{42}$, $p_{43}$, $p_{44}$, $p_{45}$, $p_{46}$, $p_{47}$ on the image I. The facial area sketching step S114 is performed to sketch the face image $I_f$ according to the chin feature point $p_8$, the right eye feature points $p_{36}$-$p_{41}$ and the left eye feature points $p_{42}$-$p_{47}$.

Please refer to FIG. 3 and FIG. 4. The facial feature marking step S112 is performed to mark the chin feature point $p_8$, fetch a plurality of right eye feature points $p_{36}$-$p_{41}$ and a plurality of left eye feature points $p_{42}$-$p_{47}$ around the right eye and the left eye, respectively, and predict an estimate right eye center coordinate (AEC$_r$_x, AEC$_r$_y) and an estimate left eye center coordinate (AEC$_l$_x, AEC$_l$_y) according to the right eye feature points $p_{36}$-$p_{41}$ and the left eye feature points $P_{42}$-$P_{47}$. The calculating method of the estimate right eye center coordinate (AEC$_r$_x, AEC$_r$_y) is satisfied by a formula (1). The facial area sketching step S114 is performed to calculate a face height face$_h$ and a face width face$_w$ of a facial area of the image I according to the estimate right eye center coordinate (AEC$_r$_x, AEC$_r$_y) and the estimate left eye center coordinate (AEC$_l$_x, AEC$_l$_y), and calculate a range of the facial area to sketch the face image $I_f$. The calculating method of the face height face$_h$ and the face width face$_w$ are satisfied by a formula (2) to a formula (5).

$$(\text{AEC}_r\_x, \text{AEC}_r\_y) = \frac{(p_{36} - p_{39}) + (p_{37} - p_{40}) + (p_{38} - p_{41})}{2}. \quad (1)$$

$$D^* = \underset{D}{\text{argmax}} \begin{cases} D_r = \|AEC_r - p_8\|_2 \\ D_l = \|AEC_l - p_8\|_2 \end{cases}. \quad (2)$$

$$face_h = face_w = D^* + \left(\frac{D^*}{\alpha_1}\right). \quad (3)$$

$$(\text{ULC\_x}, \text{ULC\_y}) = \left\{ \text{AEC}_r\_x - \frac{D^*}{\alpha_2}, \text{AEC}_r\_y - \frac{D^*}{\alpha_2} \right\}. \quad (4)$$

$$I_f = \sum_{x=ULC\_x}^{ULC\_x+face_w} \sum_{y=ULC\_y}^{ULC\_y+face_h} I(x, y). \quad (5)$$

$D^*$ is a maximum value of an Euclidean distance from the estimate right eye center coordinate (AEC$_r$_x, AEC$_r$_y) and the estimate left eye center coordinate (AEC$_l$_x, AEC$_l$_y) to the chin feature point $p_8$. $\alpha_1$ and $\alpha_2$ are adjustable coefficients. (ULC_x, ULC_y) is a coordinate of a begin point of sketching the facial area.

Please refer to FIG. 5. The frontal face generating step S12 is performed to drive the processing unit to transform the face image $I_f$ into the frontal face image $IF_f$ according to a frontal face generating model. In detail, the frontal face generating model is trained from a complete representation-generative adversarial network (CR-GAN) and a supervised-learning. The CR-GAN and the supervised-learning are conventional and will not be described again.

The eye center marking step S13 is performed to drive the processing unit to mark a frontal eye center position information C on the frontal face image $IF_f$ according to a gradient method. The eye center marking step S13 includes a weight adjusting step S132. The weight adjusting step S132 is performed to adjust a weight value of the frontal face image $IF_f$ according to an Iris-Ripple filter method. More particularly, the frontal eye center position information C includes a frontal right eye center coordinate (C$_r$_x, C$_r$_y) and a frontal left eye center coordinate (C$_l$_x, C$_l$_y). During marking the frontal eye center position information C, the shadow of the specific area (such as an eyelid area, a canthus area and an eyebrow area) of the frontal face image $IF_f$ will interfere the gradient of the frontal face image $IF_f$, and reduce the accuracy of marking the frontal eye center position information C by the gradient method. Thus, adjusting the weight value by the Iris-Ripple method can increase the locating accuracy. The Iris-Ripple filter method is satisfied by a formula (6) and a formula (7), and the Iris-Ripple method combines with the gradient method is satisfied by a formula (8).

$$R_r^* = \underset{R_r}{\text{argmax}} \begin{cases} \|p_{36} - AEC_r\|_2 \\ \|p_{39} - AEC_r\|_2 \end{cases}. \quad (6)$$

$$IR(x, y) = \sum_{k=0}^{\frac{Eye_m}{2}} \begin{cases} r\tau\{Lx, Ly\} = \omega\left(1 - \frac{r}{R_r^*}\right), \text{ if } r \le R_r^* \\ r\tau\{Lx, Ly\} = \omega(0), \text{ if } r > R_r^* \end{cases}. \quad (7)$$

$$C = \underset{C'}{\text{argmax}} \left\{ \frac{1}{N} \sum_{k=1}^{Eye_m} \sum_{y=1}^{Eye_n} IR(x, y) \right\}. \quad (8)$$

$$[\alpha_3 - IF_e(AEC(x, y)) \cdot (d'(x, y) \cdot g(x, y))^2]\}.$$

$R_r^*$ represents the eye area, $IR(x, y)$ represents the coordinate of the current adjusting pixel, $Eye_m$ represents a column number of the pixel of the eye area, $Eye_n$ represents a row number of the pixel of the eye area, r represents a radius of the eye area, $\tau=2\pi$, $\{Lx, Ly\}$ is a coordinate of a pixel which is calculated by a radius perimeter taking the estimate right eye center coordinate ($AEC_r\_x$, $AEC_{r}\_y$) and the estimate left eye center coordinate ($AEC_l\_x$, $AEC_l\_y$) as centers, $\omega(\cdot)$ is a weight value before calculating, $C'$ represents a current eye center coordinate, N is a pixel number of the eye area, $IF_e(AEC(x, y))$ is a strength of predicting the center of the eye area, $d(x, y)$ is a displacement vector between c and p(x, y), $g(x, y)$ is a gradient vector, and $\alpha_3$ is a maximum grayscale.

Please refer to FIG. 6 and FIG. 7, the geometric transforming step S14 is performed to drive the processing unit to calculate two rotating variables $face_{\theta 1}$, $face_{\theta 2}$ between the face image $I_f$ and the frontal face image $IF_f$, and calculate the eye center position information $I_{ec}$ according to the two rotating variables $face_{\theta 1}$, $face_{\theta 2}$ and the frontal eye center position information C. The geometric transforming step S14 includes a rotating variable calculating step S142 and an eye center transforming step S144. The rotating variable calculating step S142 is performed to calculate the two rotating variables $face_{\theta 1}$, $face_{\theta 2}$ between the face image $I_f$ and the frontal face image $IF_f$ according to a linear relation equation, the linear relation equation is satisfied with a formula (9).

$$\begin{cases} face_{\theta 1} = \tan^{-1}\left(\left|\frac{m_1(L_1) - m_2(L_2)}{1 + m_1(L_1) * m_2(L_2)}\right|\right) * \frac{180}{\pi} \\ face_{\theta 2} = \tan^{-1}\left(\left|\frac{m_1(L_1) - m_3(L_3)}{1 + m_1(L_1) * m_3(L_3)}\right|\right) * \frac{180}{\pi} \end{cases} \quad (9)$$

The rotating variable $face_{\theta 1}$ is a rotating variable between the face image $I_f$ and the frontal face image $IF_f$ which is rotating along the x axis (i.e., yaw rot.), the rotating variable $face_{\theta 2}$ is a rotating variable between the face image $I_f$ and the face transforming image $I_f'$ which is rotating along the z axis (i.e., roll rot.). L1 is a linear relation equation between the estimate right eye center coordinate ($AEC_r\_x$, $AEC_r\_y$) and the estimate left eye center coordinate ($AEC_l\_x$, $AEC_l\_y$), L2 is a linear relation equation between the frontal right eye center coordinate ($C_r\_x$, $C_r\_y$) and the frontal left eye center coordinate ($C_l\_x$, $C_l\_y$), and L3 is a linear relation equation between the estimate right eye center coordinate ($AEC_r\_x$, $AEC_r\_y$) and the estimate left eye center coordinate ($AEC_l\_x$, $AEC_l\_y$) after transforming into the three-dimensional coordinate. m1 is a slope of the linear relation equation L1, m2 is a slope of the linear relation equation L2, and m3 is a slope of the linear relation equation L3.

The eye center transforming step S144 is performed to predict a depth transforming coordinate ($I_{erc1}\_x$, $I_{erc1}\_y$) of the face image $I_f$ with respect to the frontal face image $IF_f$ according to the two rotating variables $face_{\theta 1}$, $face_{\theta 2}$, and calculate the eye center position information $I_{ec}$ according to the depth transforming coordinate ($I_{erc1}\_x$, $I_{erc1}\_y$). The eye center transforming step S144 predicts the depth transforming coordinate ($I_{erc1}\_x$, $I_{erc1}\_y$) by a formula (10):

$$(I_{erC1}\_x, I_{erC1}\_y) = \qquad (10)$$
$$\left\{\frac{C_r\_x - IF_{AEC_r}\_x}{\cos(face_{\theta 1}) * \cos(face_{\theta 2})}, \frac{C_r\_y - IF_{AEC_r}\_y}{\cos(face_{\theta 1}) * \cos(face_{\theta 2})}\right\}.$$

The eye center position information $I_{eC}$ includes a right eye center coordinate ($I_{erC}\_x$, $I_{erC}\_y$) and a left eye center coordinate ($I_{elC}\_x$, $I_{elC}\_y$), and ($IF_{AECr}\_x$, $IF_{AECr}\_y$) is a frontal face estimate right eye center coordinate.

In detail, after the formula (10) obtains the depth transforming coordinate ($I_{erc1}\_x$, $I_{erc1}\_y$), in order to avoid the difference between the frontal eye center position information C calculated by the frontal face image $IF_f$ which is generated from the frontal face generating model and the actual value. The eye center transforming step 144 can adjust the depth transforming coordinate ($I_{erc1}\_x$, $I_{erc1}\_y$) by a formula (11):

$$(I_{erC}\_x, I_{erC}\_y) = \left\{\left[\left(I_{erC1}\_x + \alpha 4\left(\frac{I_{erC2}\_x - AEC_r\_x}{\cos(face_{\theta 1}) * \cos(face_{\theta 2})}\right)\right) * \right. \right. \quad (11)$$
$$\cos(face_{\theta 1}) * \cos(face_{\theta 2})\Big],$$
$$[(I_{erC1}\_y + AEC_r\_y) * \cos(face_{\theta 1}) * \cos(face_{\theta 2})]\Big\}.$$

($I_{erc2}\_x$, $I_{erc2}\_y$) is a frontal right eye center coordinate which has a big difference with the actual value, $\alpha_4$ is a correction coefficient. Thus, the eye center localization method 100a of the present disclosure adjusts the eye center position information $I_{eC}$ by the correction coefficient $\alpha_4$ to avoid the difference caused by the frontal face image $IF_f$, thereby increasing the accuracy of the eye center position information $I_{eC}$.

Figure 8:
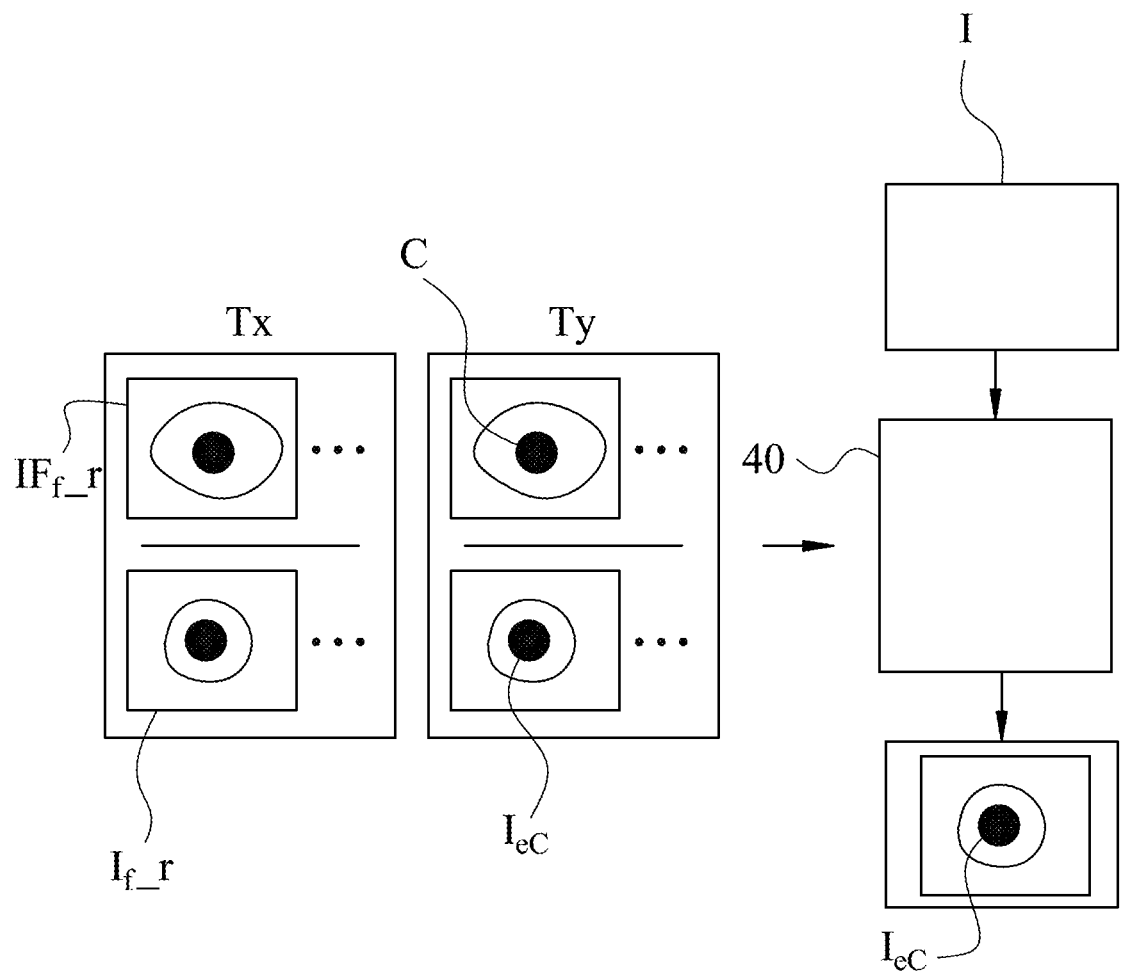
FIG. 8 shows a schematic view of a model training step of the eye center localization method of FIG. 2.

Please refer to FIG. 2 to FIG. 8. FIG. 8 shows a schematic view of a model training step S15 of the eye center localization method 100a of FIG. 2. The eye center localization method 100a of FIG. 2 can further include a model training step S15. The model training step S15 is performed to drive the processing unit to train the face image $I_f$, the eye center position information $I_{eC}$, the frontal face image $IF_f$ and the frontal eye center position information C to generate an eye center locating model 40. In other words, the model training step S15 sketches the eye region images $I_f\_r$, $IF_f\_r$ from the face image If and the frontal face image $IF_f$, respectively, takes the eye region before marking the eye center position information $I_{eC}$ and the frontal eye center position information C as a first training sample Tx, and takes the eye region after marking the eye center position information $I_{eC}$ and the frontal eye center position information C as a second training sample Ty. The first training sample Tx and the second training sample Ty are trained by an image translation learning to generate the eye center locating model 40. Thus, the eye center localization method 100a of the present disclosure can predict the eye center position information $I_{eC}$ from the image I directly by the eye center locating model 40.

Figure 9:
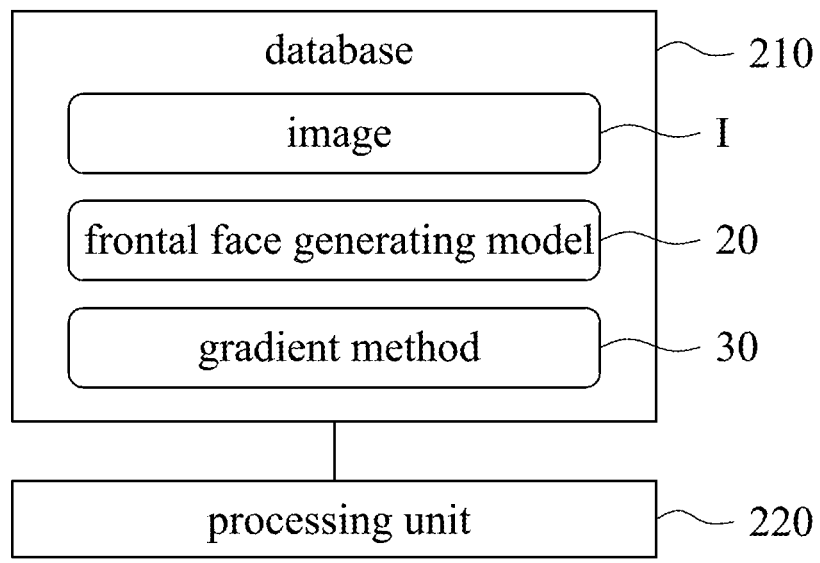
FIG. 9 shows a block diagram of an eye center localization system according to a third embodiment of the present disclosure.

Please refer to FIG. 9. FIG. 9 shows a block diagram of an eye center localization system 200 according to a third embodiment of the present disclosure. The eye center localization system 200 is configured to locate an eye center position information $I_{ec}$ from an image I. The eye center localization system 200 includes a database 210 and a processing unit 220.

The database 210 is configured to access the image I, a frontal face generating model 20 and a gradient method 30. In detail, the database 210 can be a memory or other data accessing element.

The processing unit 220 is electrically connected to the database 210, the processing unit 220 receives the image I, the frontal face generating model 20 and the gradient method 30, and the processing unit 220 is configured to implement the eye center localization methods 100, 100a. In detail, the processing unit 220 can be a microprocessor, a central processing unit (CPU) or other electronic processing unit, but the present disclosure is not limited thereto. Thus, the eye center localization system 200 locates the eye center position information $I_{eC}$ from an image I with non-frontal face.

According to the aforementioned embodiments and examples, the advantages of the present disclosure are described as follows.

1. The eye center localization method and localization system thereof locate the eye center position information from image with non-frontal face.

2. The eye center localization method of the present disclosure adjusts the eye center position information by the correction coefficient to avoid the difference caused by the frontal face image, thereby increasing the accuracy of the eye center position information.

3. The eye center localization method of the present disclosure can predict the eye center position information from the image directly by the eye center locating model.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An eye center localization method, which is configured to locate an eye center position information from an image, the eye center localization method comprising:
performing an image sketching step to drive a processing unit to sketch a face image from the image of a database;
performing a frontal face generating step to drive the processing unit to transform the face image into a frontal face image according to a frontal face generating model;
performing an eye center marking step to drive the processing unit to mark a frontal eye center position information on the frontal face image according to a gradient method; and
performing a geometric transforming step to drive the processing unit to calculate two rotating variables between the face image and the frontal face image, and calculate the eye center position information according to the two rotating variables and the frontal eye center position information;
wherein the eye center marking step comprises:
performing a weight adjusting step to adjust a weight value of the frontal face image according to an Iris-Ripple filter method.

2. The eye center localization method of claim 1, wherein the image sketching step comprises:
performing a facial feature marking step to mark a chin feature point, a right eye feature point and a left eye feature point on the image; and
performing a facial area sketching step to sketch the face image according to the chin feature point, the right eye feature point and the left eye feature point.

3. The eye center localization method of claim 1, wherein the geometric transforming step comprises:
performing a rotating variable calculating step to calculate the two rotating variables between the face image and the frontal face image according to a linear relation equation; and
performing an eye center transforming step to predict a depth transforming coordinate of the face image with respect to the frontal face image according to the two rotating variables, and calculate the eye center position information according to the depth transforming coordinate.

4. The eye center localization method of claim 1, further comprising:
performing a model training step to drive the processing unit to train the face image, the eye center position information, the frontal face image and the frontal eye center position information to generate an eye center locating model.

5. An eye center localization system, which is configured to locate an eye center position information from an image, the eye center localization system comprising:
a database configured to access the image, a frontal face generating model and a gradient method; and
a processing unit electrically connected to the database, wherein the processing unit receives the image, the frontal face generating model and the gradient method and is configured to implement an eye center localization method comprising:
performing an image sketching step to sketch a face image from the image;
performing a frontal face generating step to transform the face image into a frontal face image according to the frontal face generating model;
performing an eye center marking step to mark a frontal eye center position information on the frontal face image according to the gradient method; and
performing a geometric transforming step to calculate two rotating variables between the face image and the frontal face image, and calculate the eye center position information according to the two rotating variables and the frontal eye center position information;
wherein the eye center marking step comprises:
performing a weight adjusting step to adjust a weight value of the frontal face image according to an Iris-Ripple filter method.

6. The eye center localization system of claim 5, wherein the image sketching step comprises:
performing a facial feature marking step to mark a chin feature point, a right eye feature point and a left eye feature point on the image; and
performing a facial area sketching step to sketch the face image according to the chin feature point, the right eye feature point and the left eye feature point.

7. The eye center localization system of claim 5, wherein the geometric transforming step comprises:

performing a rotating variable calculating step to calculate the two rotating variables between the face image and the frontal face image according to a linear relation equation; and performing an eye center transforming step to predict a depth transforming coordinate of the face image with respect to the frontal face image, and calculate the eye center position information according to the depth transforming coordinate.

8. The eye center localization system of claim 5, wherein the processing unit further comprises:

performing a model training step to train the face image, the eye center position information, the frontal face image and the frontal eye center position information to generate an eye center locating model.

* * * * *